(12) United States Patent
Figueroa

(10) Patent No.: US 9,106,596 B2
(45) Date of Patent: *Aug. 11, 2015

(54) METHOD AND APPARATUS OF CONFIGURING A DATA BROADCAST SERVICE

(71) Applicant: KASEYA INTERNATIONAL LIMITED, St. Helier (JE)

(72) Inventor: Javier Alejandro Figueroa, Pembroke Pines, FL (US)

(73) Assignee: KASEYA LIMITED, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 14/298,146

(22) Filed: Jun. 6, 2014

(65) Prior Publication Data
US 2014/0289335 A1    Sep. 25, 2014

Related U.S. Application Data

(63) Continuation of application No. 13/099,832, filed on May 3, 2011, now Pat. No. 8,751,574.

(51) Int. Cl.
| G06F 15/16 | (2006.01) |
| H04L 12/58 | (2006.01) |
| H04L 29/08 | (2006.01) |
| H04L 12/18 | (2006.01) |

(52) U.S. Cl.
CPC ............ *H04L 51/02* (2013.01); *H04L 12/1881* (2013.01); *H04L 67/142* (2013.01); *H04L 67/36* (2013.01)

(58) Field of Classification Search
CPC ...................................................... H04L 67/36
USPC .................................................. 709/203, 204
See application file for complete search history.

(56) References Cited

U.S. PATENT DOCUMENTS

| 6,647,410 B1 * | 11/2003 | Scimone et al. ............... 709/206 |
| 6,950,875 B1 * | 9/2005 | Slaughter et al. ............. 709/230 |

* cited by examiner

*Primary Examiner* — Adnan Mirza

(57) ABSTRACT

Disclosed are an apparatus and method of broadcasting a message to one or more servers operating in one or more domains. One example method of operation may include creating a message to be broadcasted via user input provided by a user of a computer interface. The method may also include serializing the message to a predetermined format and transmitting the message to an application programming interface (API). The method may also provide scheduling a broadcast of the message based on the user input, and transmitting the message to the at least one server responsive to the scheduled broadcast.

20 Claims, 3 Drawing Sheets

METHOD AND APPARATUS OF CONFIGURING A DATA BROADCAST SERVICE

CROSS-REFERENCE TO RELATED APPLICATIONS

The instant application is a continuation of and claims priority from U.S. patent application Ser. No. 13/099,832, filed May 3, 2011, entitled METHOD AND APPARATUS OF CONFIGURING A DATA BROADCAST SERVICE, now U.S. Pat. No. 8,751,574, issued on Jun. 10, 2014, the entire contents of which are incorporated by reference herein.

TECHNICAL FIELD OF THE INVENTION

This invention relates to a method and apparatus of configuring a data broadcast service application, and in particular, to autonomously creating a scheduled broadcast based on user input preferences.

BACKGROUND OF THE INVENTION

User workstations or subscriber devices, personal computers (PCs), handheld devices, tablet devices, smart phone devices, and other web capable devices operate in a communication network by communicating with controlling devices, servers and access points. In order for the web capable device to receive messages from another device operating in the communication network it needs to subscribe to a broadcasting channel of communication. The subscription process may include, for example, one or more hyper text transfer protocol (HTTP) POST requests. For instance, one POST request may be for a subscription and another POST request may be to acknowledge the subscription.

A POST request is used to send data to be processed to a server, which may be performed by a common gateway interface (CGI) script. A POST request may include a block of data sent with the request in the message body. A POST request may also include extra headers to describe the message body, such as content-type and content-length. The HTTP response is normally program output and is not a static file. POST can be used to request various different data types.

"POST" is one of many request methods supported by the hypertext transfer protocol (HTTP) used by Internet users of the world wide web. The POST request may be used when the client needs to send data to the server as part of the request, for example, when uploading a file or submitting a completed form to a server. In contrast to the more general "get me this resource" (GET) request method, where only a URL and headers are sent to the server, POST requests also include a message body. This allows for arbitrary data length of any type to be sent to the server. For instance, headers used in a POST request may indicate the message body's Internet media type to the server.

In general, POST requests are used to transfer data from a client to a web server since the web server does not log the sent data. This permits binary data to be sent, which is useful for transferring byte arrays or serialized Java objects, such as JavaScript object notation message (JSON) format. POST provides the portability of the request to any server platform. This allows for any web capable server to be a subscriber of the broadcast service without any extra configuration or software, additionally it allows the system to be programming language agnostic because most web languages are capable of consuming POST requests.

Users of web enabled devices may desire to perform administrative functions with minimal input. For example, backend applications, such as general purpose servers, e-mail servers, calendar servers and other communication servers may require substantive administrator experience to configure and execute user commands. Currently, there are various different communication methods implemented between servers which utilize a subscription/subscriber pattern, however, these methods require a live remote connection between servers by utilizing a TCP or UDP-based connection.

SUMMARY OF THE INVENTION

One embodiment of the present invention may include a method of broadcasting a message to at least one server, the method may include creating a message to be broadcasted via user input, serializing the message to a predetermined format, transmitting the message to an application programming interface (API), scheduling a broadcast of the message based on the user input, and transmitting the message to the at least one server responsive to the scheduled broadcast.

Another example embodiment of the present invention may include an apparatus configured to broadcast a message to at least one server. The apparatus may include a user interface configured to receive user input to create a message to be broadcasted. The apparatus may also include a processor configured to serialize the message to a predetermined format, and a transmitter configured to transmit the message to an application programming interface (API). The processor is further configured to schedule a broadcast of the message based on the user input, and the transmitter is further configured to transmit the message to the at least one server responsive to the scheduled broadcast.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as, packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Figure 1:
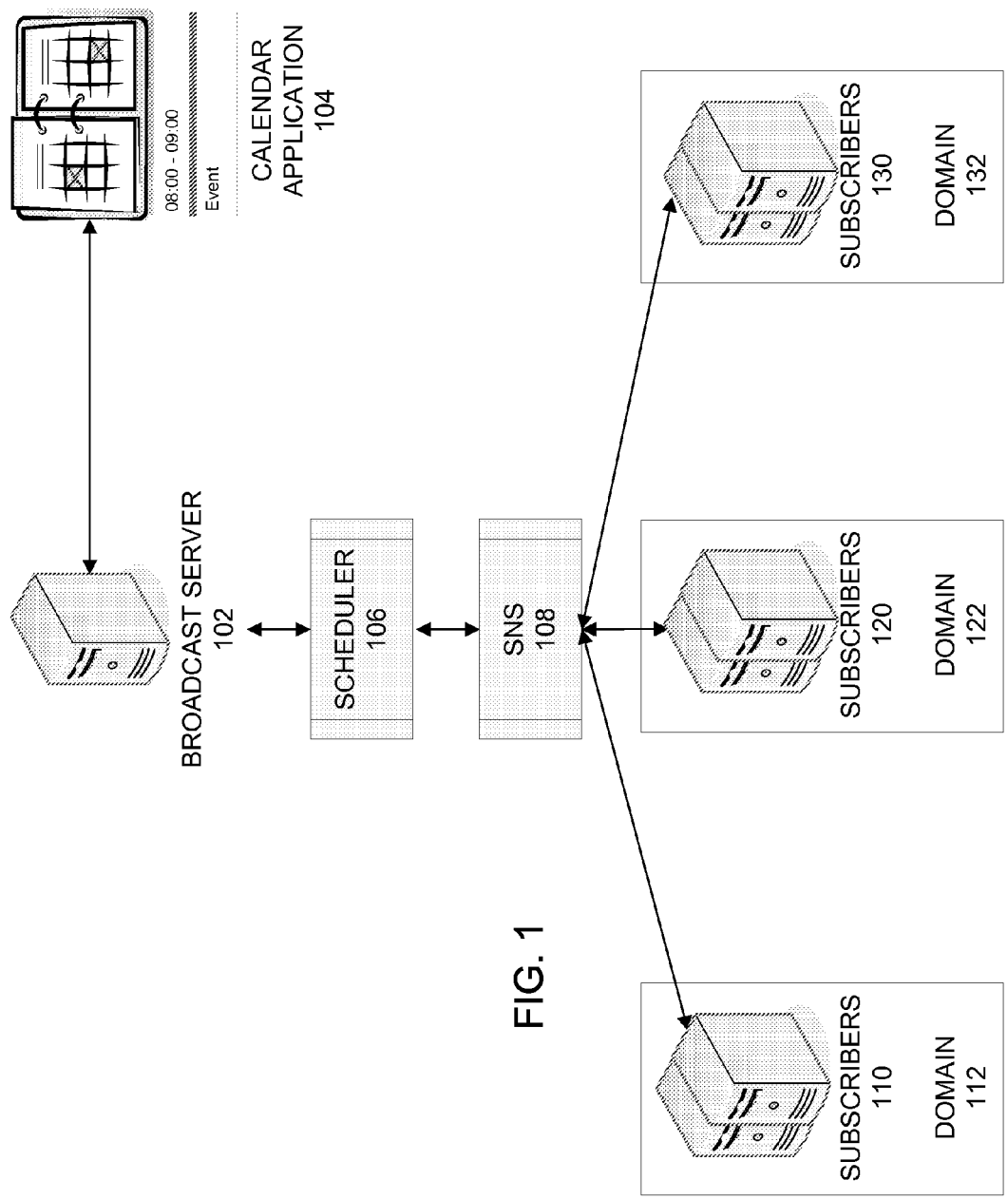
FIG. 1 illustrates example network configurations, according to example embodiments of the present invention.

FIG. 1 illustrates a communication network according to example embodiments of the present invention. Referring to FIG. 1, a broadcast server 102 provides an interface for a user to input a message. The message may be a calendar entry corresponding to a calendar application 104 installed on the broadcast server 102. The message may include a range of times for the message to be broadcasted (e.g., every day, every two days, once a week, etc.). The message is transferred to a scheduler engine 106 that is in communication with a notification service 108. Subscribers 110, 120 and 130 may be part of different domains 112, 122 and 132, respectively. The subscribers 110-130 may receive the calendar message(s) from the NS 108 depending on their status and subscription information.

As stated above, the broadcast server 102 provides an interface for a user to input or create a message with a range of dates for this message to be broadcasted. For example, the range of dates may be a multiple-layered calendar request to be performed by the calendar application 104 at the specified times. The actual message could be anything that is required for a successful communication to be established. For instance, in the case of scheduling a date for a specific task to be performed, the transferred message will include at least one date. The message contents and format are based on the application. In this example, the message will need at least one date, allowing the subscriber(s) to know when the contents of the message should be executed and/or scheduled.

An example message is composed of a text subject included in the message body. The text subject may include a date and the body of the message may include other information that is being broadcasted. The message body could be simple text or an object. This message is serialized to JSON including a target host URL. An example of serializing a data message into JSON may include: {"subject": "11-12-2011 09:30:30", "body": {"subject": "maintenance", "body": "The server is undergoing maintenance"}}. This example is based on a scheduled server maintenance date that includes a numeric date, time and description of the service to be performed.

According to example embodiments of the present invention, cross-domain message broadcasting (e.g., domains 112, 122 and/or domain 132) via HTTP POST requests may be performed without a "live" or "open" communication between web servers. A user may schedule tasks to multiple web servers that reside in heterogeneous domains by implementing HTTP POST requests. One example may include the scheduling of a maintenance period for multiple web servers. Since the subscribed web servers do not require an active connection be setup between the various web servers, the channel maintenance overhead for communication between the web server sender and web server receiver may be reduced or eliminated.

The message may be sent to a calendar application, such as Google® Calendar via the Google calendar REST API. REST-styled architectures include clients and servers. Clients initiate requests to servers, while servers process requests and return appropriate responses. Requests and responses are built around the transfer of representations of resources. A resource can be essentially any coherent and meaningful concept that may be addressed. A representation of a resource is typically a document that captures the current or intended state of a resource.

At any particular time, a client can either be in transition between application states or "at rest." A client in a rest state is able to interact with its user, but creates no load and consumes no per-client storage on the servers or on the network. The client begins sending requests when it is ready to make the transition to a new state. While one or more requests are outstanding, the client is considered to be in transition. The representation of each application state contains links that may be used next time the client chooses to initiate a new state transition. RESTful applications maximize the use of the pre-existing, well-defined interface and other built-in capabilities provided by the chosen network protocol, and minimize the addition of new application-specific features on top of it.

In operation, the message generated by the user includes information that could be used to schedule an operation for the subscribed servers 110-130. The message will be broadcasted to those subscribed servers 110-130 via the broadcast server 120. The message will be submitted to the scheduling engine (scheduler) 106. The scheduler executes a code based on the user's input dates to send the message to the notification engine such as Amazon simple notification service (SNS). The code refers to the software-based program that schedules the execution of other software, such as Microsoft® Message Queuing. Scheduler software solutions are well-known and therefore the details of the software program scheduling operations will be omitted from further discussion.

The message is broadcasted to all subscriber web applications via a HTTP POST message format in a domain agnostic manner. Because the message is broadcasted to a notification engine, the sender only needs to send a POST request to this notification engine including the message. The engine is then capable of sending a POST request to each of its subscribers (other servers) with the same message. Because the subscribers can reside in different domains, the communication may be referred to as domain agnostic.

The subscriber web application hosts a rest endpoint that receives the message/notification. This REST endpoint includes logic to acknowledge if a message/notification is a request for subscription or a regular message, and, if a request for notification is received the endpoint returns a HTTP response to confirm its subscription. The term "REST endpoint" is used to indicate that the URL is residing in a web server. The REST endpoint is capable of understanding REST-based operations. If the received message is deemed a regular message it may process the message and either store its contents or use them for the purpose of a hosted web application.

The message used to confirm a subscription has a specific format based on the notification engine used by the application service. Regular messages have a different format than a subscription confirmation message and therefore are treated as messages sent from a broadcast server. Referring to FIG. 1, the domains 1, 2, . . . N are symbolic representations of heterogeneous web domains such as kaseya.com, google.com, msn.com, etc. The service operation messages and their corresponding responses are encoded as JavaScript object notation messages (JSON), which are used to represent simple data structures and associative arrays or objects. JSON is language-independent and uses parsing which provides interoperability of different programming languages and their corresponding operating environments.

According to one example embodiment, a user accesses the system via a user interface. This interface allows the user to create a dated message or event via some form of text and/or calendar input. This message is built and serialized to JSON upon creation. The message or event is scheduled by a scheduling system, and is to be executed on the date specified by the user. Once the message is triggered for execution from within the scheduling system, a code will send this message to a notification engine, such as the Amazon simple notification service SNS 108 via an HTTP request. This engine will then broadcast the message using an HTTP request to each of the subscribers' endpoint, presumably web servers 110, 120 and/or 130. The message arrives at the web servers or subscribers as a HTTP request and the server(s) are capable of de-serializing the JSON message and executing a code based on the message. The subscribers or web servers can belong to any web domain, and the time between transmitting and processing messages, the system has the potential of being idle.

Figure 2:
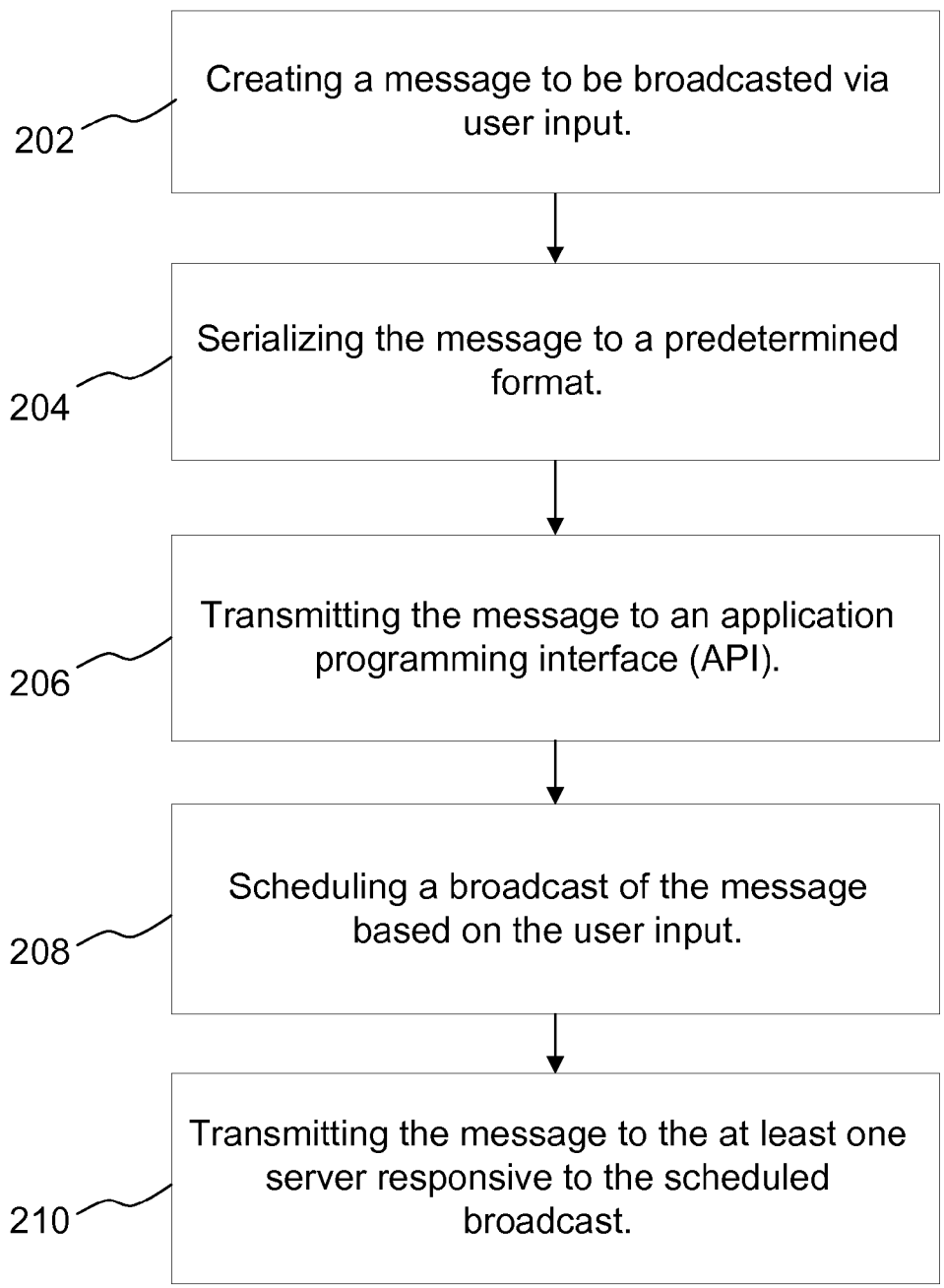
FIG. 2 illustrates a flow diagram of an example method according to an example embodiment of the present invention.

FIG. 2 illustrates a flow diagram illustrating an example method of operation according to an example embodiment of the present invention. Referring to FIG. 2, a method of broadcasting a message to at least one server is disclosed. The method may include creating a message to be broadcasted via user input, at operation 202. The method may also include serializing the message to a predetermined format, at operation 204, transmitting the message to an application programming interface (API), at operation 206, scheduling a broadcast of the message based on the user input, at operation 208 and transmitting the message to the at least one server responsive to the scheduled broadcast, at operation 210.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 3 illustrates an example network element 300, which may represent any of the above-described network components 102, 106, 108, 110, 120, 130, etc.

Figure 3:
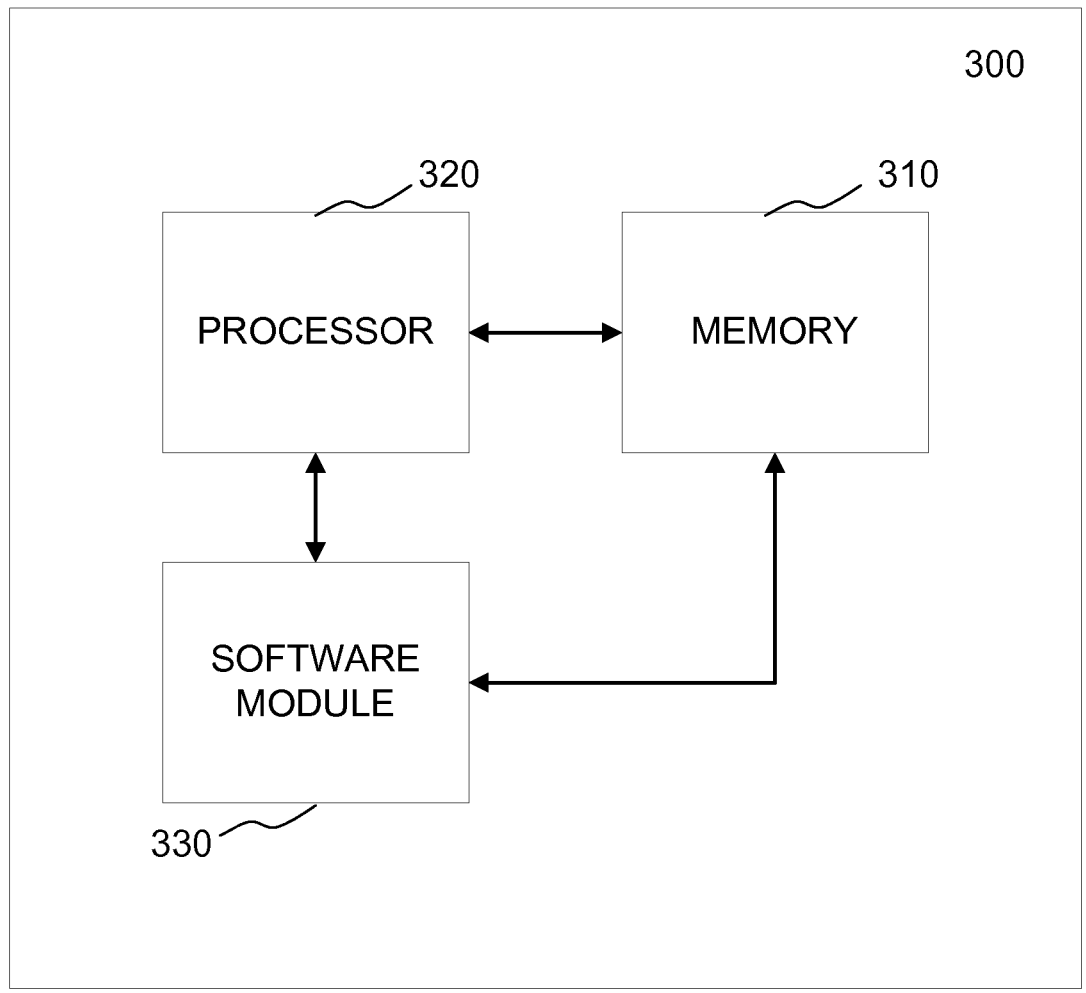
FIG. 3 illustrates an example network entity device configured to store instructions, software, and corresponding hardware for executing the same, according to example embodiments of the present invention.

As illustrated in FIG. 3, a memory 310 and a processor 320 may be discrete components of the network entity 300 that are used to execute an application or set of operations. The application may be coded in software in a computer language understood by the processor 320, and stored in a computer readable medium, such as, the memory 310. The computer readable medium may be a non-transitory computer readable medium that includes tangible hardware components in addition to software stored in memory. Furthermore, a software module 330 may be another discrete entity that is part of the network entity 300, and which contains software instructions that may be executed by the processor 320. In addition to the above noted components of the network entity 300, the network entity 300 may also have a transmitter and receiver pair configured to receive and transmit communication signals (not shown).

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method of broadcasting a message, the method comprising:
creating a message to be broadcasted based on at least one scheduling parameter of a calendar application;
serializing the message to a predetermined format;
transmitting the message to an application programming interface (API);
scheduling a broadcast of the message based on via a scheduling application of a broadcast server based on the at least one scheduling parameter; and
transmitting the message responsive to the scheduled broadcast.

2. The method of claim 1, wherein the message is a calendar message comprising at least one date to be broadcast and at least time to be broadcast.

3. The method of claim 2, wherein the serialized message is a JavaScript object notation message (JSON) comprising a subject portion that includes at least one date and time, and at least one body portion that includes other message information.

4. The method of claim 1, further comprising:
receiving a hyper text transfer protocol (HTTP) response to confirm the at least one server's subscription to the broadcast, the HTTP response being received responsive to the broadcast message.

5. The method of claim 1, wherein the message further comprises a target uniform resource locator (URL) associated with at least one server.

6. The method of claim 1, wherein the message is broadcast to a plurality of domains via a HTTP POST message.

7. The method of claim 1, wherein the message is broadcast to a REST endpoint device.

8. An apparatus configured to broadcast a message, the apparatus comprising:
a user interface configured to create a message to be broadcasted based on at least one scheduling parameter of a calendar application;
a processor configured to serialize the message to a predetermined format;
a transmitter configured to transmit the message to an application programming interface (API); and
wherein the processor is further configured to schedule a broadcast of the message via a scheduling application based on the at least one scheduling parameter, and the transmitter is further configured to transmit the message responsive to the scheduled broadcast.

9. The apparatus of claim 8, wherein the message is a calendar message comprising at least one date to be broadcast and at least time to be broadcast.

10. The apparatus of claim 9, wherein the serialized message is a JavaScript object notation message (JSON) comprising a subject portion that includes at least one date and time, and at least one body portion that includes other message information.

11. The apparatus of claim 8, further comprising:
a receiver configured to receive a hyper text transfer protocol (HTTP) response to confirm the at least one server's subscription to the broadcast, the HTTP response being received responsive to the broadcast message.

12. The apparatus of claim 8, wherein the message further comprises a target uniform resource locator (URL) associated with at least one server.

13. The apparatus of claim 8, wherein the message is broadcast to a plurality of domains via a HTTP POST message.

14. The apparatus of claim 8, wherein the message is broadcast to a REST endpoint device.

15. A non-transitory computer readable storage medium comprising instructions that when executed cause a processor to perform broadcasting a message, the processor being further configured to perform:
creating a message to be broadcasted based on at least one scheduling parameter of a calendar application;
serializing the message to a predetermined format;
transmitting the message to an application programming interface (API);
scheduling a broadcast of the message via a scheduling application of a broadcast server based on the at least one scheduling parameter; and
transmitting the message responsive to the scheduled broadcast.

16. The non-transitory computer readable storage medium of claim 15, wherein the message is a calendar message comprising at least one date to be broadcast and at least time to be broadcast.

17. The non-transitory computer readable storage medium of claim 16, wherein the serialized message is a JavaScript object notation message (JSON) comprising a subject portion that includes at least one date and time, and at least one body portion that includes other message information.

18. The non-transitory computer readable storage medium of claim 16, wherein the processor is further configured to perform:
receiving a hyper text transfer protocol (HTTP) response to confirm the at least one server's subscription to the broadcast, the HTTP response being received responsive to the broadcast message.

19. The non-transitory computer readable storage medium of claim 16, wherein the message further comprises a target uniform resource locator (URL).

20. The non-transitory computer readable storage medium of claim 16, wherein the message is broadcast to a plurality of domains via a HTTP POST message.

* * * * *